(12) United States Patent
Emens et al.

(10) Patent No.: US 6,832,218 B1
(45) Date of Patent: Dec. 14, 2004

(54) SYSTEM AND METHOD FOR ASSOCIATING SEARCH RESULTS

(75) Inventors: Michael L. Emens, San Jose, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 09/668,560

(22) Filed: Sep. 22, 2000

(51) Int. Cl.$^7$ ............................................. G06F 17/30
(52) U.S. Cl. ............................................. 707/3; 707/5
(58) Field of Search ................................ 707/1–3, 5–7

(56) References Cited

U.S. PATENT DOCUMENTS

| | | | |
|---|---|---|---|
| 5,428,735 A | * 6/1995 | Kahl et al. | 345/839 |
| 5,515,488 A | * 5/1996 | Hoppe et al. | 345/440 |
| 5,742,816 A | * 4/1998 | Barr et al. | 707/3 |
| 5,802,518 A | * 9/1998 | Karaev et al. | 707/9 |
| 5,862,223 A | * 1/1999 | Walker et al. | 705/50 |
| 5,940,493 A | * 8/1999 | Desai et al. | 379/260 |
| 6,006,222 A | * 12/1999 | Culliss | 707/5 |
| 6,012,053 A | * 1/2000 | Pant et al. | 707/3 |
| 6,029,192 A | * 2/2000 | Hill et al. | 709/206 |
| 6,078,916 A | * 6/2000 | Culliss | 707/5 |
| 6,298,356 B1 | * 10/2001 | Jawahar et al. | 707/201 |
| 6,321,228 B1 | * 11/2001 | Crandall et al. | 707/10 |
| 6,430,558 B1 | * 8/2002 | Delano | 707/5 |
| 6,671,681 B1 | * 12/2003 | Emens et al. | 707/5 |
| 6,718,324 B2 | * 4/2004 | Edlund et al. | 707/5 |

* cited by examiner

*Primary Examiner*—Uyen Le
*Assistant Examiner*—Hanh Thai
(74) *Attorney, Agent, or Firm*—Stephen Bongini; Fleit, Kain, Gibbons, Gutman, Bongini & Bianco P.L.

(57) ABSTRACT

A method for associating search results is provided. According to the method, an original list of search results is provided to a first user in response to a first query, and the search results selected by the first user are recorded and associated with the first query. Additionally, a second query that is the same as or similar to the first query is received from a second user, and an alternate list of search results is provided to the second user. The alternate list lists those search results from the original list that have been associated with the first query due to selection by a user. Also provided is a system for providing search results that includes a search engine, a query database, and a controller. The search engine provides original lists of search results in response to queries, and the query database stores the search results selected by users in response to each of the queries. The controller provides an alternate list of search results in response to another query that is the same as or similar to one of the queries, with the alternate list of search results listing those search results from the original list that have been recorded in the query database as having been previously selected in response to the one query.

20 Claims, 7 Drawing Sheets

Fig. 1C (1) http://www.catsanddogs.com
   Abstract: Why don't cats and dogs like each other? Find out why....

(2) http://www.cats.com
   Abstract: Cats and their nine lives. Are there more than nine? Find out....

(3) http://www.catanddoggrooming.com
   Abstract: Why dogs like water and cats don't....

(4) http://www.mansbestfriend-and-ninelives.com
   Abstract: Is dog mans best friend? Or is the cat? Find out who really is

SYSTEM AND METHOD FOR ASSOCIATING SEARCH RESULTS

BACKGROUND OF THE INVENTION

1. Field of the Invention

The present invention relates to search engines, and more specifically to a system and method for associating search results that were selected by users in previous search sessions.

2. Description of Related Art

The Internet is a massive, complex, and constantly growing environment in which terabytes of information can now be retrieved from computer systems at various locations. However, traversing and navigating the Internet becomes increasingly difficult and more of a time consuming endeavor as this explosive growth continues. Currently, searching for and finding relevant information on the Internet is a difficult task for both beginners and advanced users. Thus, it is becoming more and more important to improve the quality of the information that is returned in response to a user query.

With conventional search engines, a user looking for specific information on the Internet typically submits a query (i.e., a boolean logic construct of words) to the search engine. In response, the search engine uses the query to search the Internet for the desired information, and then returns a list containing zero or more search results based on what was found. Because the Internet is expanding rapidly, these searches are returning larger and larger sets of results. Therefore, the user is required to spend more and more time sifting through the results of a search in order to find the information that is actually of interest.

Typically, the list of search results returned by a conventional search engine is sorted by relevance based on how many times the words in the user's query are found in each result. This type of indexing is done automatically based on a formula, and then all of the results returned by the search engine are presented to the user in an order determined by the relevancy scores. While this may be necessary the first time a query is made, a search engine is used by many users and two or more users often will independently search for similar information or topics. The conventional technique of automatically indexing and then listing all results for a query does not take advantage of the superior ability of humans to evaluate information.

Furthermore, recently proposed search result ordering techniques also fail to adequately improve the quality of the results that are returned to the user. For example, it has been proposed to order the results returned by a search engine according to the overall popularity of the results. In particular, each metadata abstract or URL (i.e., possible search result) is assigned a popularity count based on all user selections that have previously been made in response to all previous queries. Then, when a list of search results (i.e., URLs) is returned in response to a particular query, the search engine lists all of the results for the user in an order that is based on the popularity count for each result. In other words, the search results are merely ordered based on each results overall popularity with users in general. Like conventional search engines, such search result ordering techniques also fail to take advantage of the superior ability of humans to effectively evaluate search results.

Additionally, both the conventional search engines and the recently proposed search result ordering techniques fail to automatically sift through the search results so as to present the user with only the results that are actually of interest For example, it is common for a typical multiple keyword query of the Internet to return well in excess of 100,000 search results (i.e., URLs). With conventional search engines, at best the user is presented with a well ordered list that contains all of the results found by the search engine in response to the user's query. Conventional search engines lack the ability to sort through the results so as to return a more manageable list to the user, while at the same time effectively providing the user with the information that is actually being sought.

SUMMARY OF THE INVENTION

In view of these drawbacks, it is an object of the present invention to remove the above-mentioned drawbacks and to provide a system and method for associating search results based on the search results selected by users in response to previous searches. The system monitors user search result selections relative to search queries. When a search is performed, the user can be presented with those search results that were previously selected by users in response to the same or a similar query. Thus, a user can leverage the knowledge and evaluation time of previous users that were searching for the same or similar information.

Another object of the present invention is to provide a system and method for automatically sifting through search results so as to present the relevant or most relevant results. Thus, a smaller and more focused search result list can be presented to the user.

One embodiment of the present invention provides a method for associating search results. According to the method, an original list of search results is provided to a first user in response to a first query, and the search results selected by the first user are recorded and associated with the first query. Additionally, a second query that is the same as or similar to the first query is received from a second user, and an alternate list of search results is provided to the second user. The alternate list lists those search results from the original list that have been associated with the first query due to selection by a user. In a preferred method, the original list of search results is displayed to the second user, a request is received to view the alternate list of search results, and the alternate list of search results is displayed to the second user.

Another embodiment of the present invention provides a system for providing search results. The system includes a search engine, a query database, and a controller. The search engine provides original lists of search results in response to queries, and the query database stores the search results selected by users in response to each of the queries. The controller provides an alternate list of search results in response to another query that is the same as or similar to one of the queries, with the alternate list of search results listing those search results from the original list that have been recorded in the query database as having been previously selected in response to the one query. In one preferred embodiment, the query database stores each selected search result, and for each stored searched result, an alternate results vector for each of the queries in response to which the stored search result was selected.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail herein below with reference to the attached drawings.

To search the Internet with a conventional search engine, a user submits a query to the search engine. The search engine then performs a search and returns one or more pages that list external resources that potentially contain the information being sought by the user. Typically, each external resource (i.e., search result) is identified by a hyperlink (URL) that can automatically take the user to the resource and a short abstract of the resource. The user must read through the list of abstracts returned by the search engine and will eventually activate the hyperlink for one of the search results to allow closer examination of that resource. Later, the user may return to the list of search results and select one or more additional hyperlinks for further examination. Each time the user selects a hyperlink, a page from the corresponding external resource is downloaded into the user's viewing device (e.g., web browser).

If a second user later uses the same search engine to independently search for the same information as the previous user (i.e., submits the same query), the second user is also presented with the same list of search results as the previous user. Thus, the second user must also start from scratch and again sift through all of the abstracts of external resources. The second user will not be able to take advantage of the time and energy spent by the previous user in evaluating the search results in response to the same query. In other words, conventional search engines force each user to independently evaluate the same search results because each user has no way of knowing the search results that were selected by previous users in response to the same or a similar query.

A searching process according to an embodiment of the present invention in which search results are associated based on user selections in response to similar searches will now be described. In this example, both users are searching for a particular implementation of the Quicksort algorithm. The first user constructs a complex query (e.g., using the "Advanced Powersearch" search form of IBM's jCentral search engine) that is submitted to the search engine. The search engine searches the Internet and returns a search results page that lists 100 hyperlinks (URLs) to external resources that contain various implementations of the Quicksort algorithm.

The user reads through the abstracts for the resources and eventually chooses the hyperlink for one of the resources that appears to contain the desired information. The user is taken to the selected external resource and a page is downloaded into the user's viewing device (e.g., web browser) to allow the user to more closely examine the information provided by the selected search result After reviewing this resource, the user may return to the original search results page and select one or more of the other hyperlinks to external resources for further review. As the first user peruses the search results returned by the search engine, all of the hyperlinks that are selected for further examination are recorded. For example, in one embodiment every time the first user chooses one of the hyperlinks on the results page, that eternal resource (URL) is associated with the user's original search query and this relationship is stored in a database.

Later, a second user seeking the Quicksort algorithm submits the same query to the search engine. In response, the search engine retrieves a list of search results that contains hyperlinks (URLs) to external resources. Before presenting the search results to the second user, each hyperlink is cross referenced with the selections made by other users that submitted the same query to the search engine. More specifically, the database is searched to identify all of the retrieved hyperlinks that have previously been chosen for the same query. For each search result that was previously chosen, the search engine places an icon (e.g., labeled "See What Others Selected" or "Show Alternate Results") next to that search result when displaying the list of search results to the second user.

At this point, the second user can peruse the search results in the normal manner or can select one of the alternate results icons. If an alternate results icon is selected, the search engine returns a new list to the second user that lists those search results (URLs) that have previously been selected in response to the same query (as indicated by the relationships stored in the database). Thus, the second user can take advantage of the time and energy that previous users seeking the same information (such as the first user) used to evaluate the search results. In general, this will present the second user with a much smaller and more manageable list of more relevant search results.

While one specific embodiment of the invention has been described above, many modifications are possible for specific applications. For example, a count of the number of times each hyperlink has previously been selected in response to the same query can also be stored in the database. The relative counts can then be used to order the original list of search results and/or the alternate list of search results that were previously selected. Further, the actual count values can be displayed to the user along with the search results in order to further assist the user in making a selection. The count value can also be used to set a minimum threshold of selections before a search result is added to the alternate list. Similarly, the alternate results icon or link can be displayed in various ways and at various times. For example, the icon can be presented alongside some or all of the search results, at the beginning and/or end of the original list of search results, or on each page of the original list of search results. Additionally, the alternate results icon can be displayed before, at the same time as, or after the search engine displays the original list of search results.

Furthermore, the search engine may contain various other features to assist the user in finding the desired information. For example, the search engine may be able to identify similar but different queries that would return the same (or virtually identical) search results using conventional query matching techniques. This would allow the search engine to cross reference the search results with the selections made by previous users that submitted similar but different queries to the search engine. Thus, a user could benefit from the selections made by previous users that were seeking the same or similar information using different queries. Additionally, the search engine could contain query refinement features to assist users in formulating queries. Then, a user can submit a partial query string that the search engine will enhance based on which search results the user selects or the abstracts of the search results that are selected. For example, if the user selects a hyperlinked word in one of the abstracts, then that word is concatenated to the previous search query to form a more complete query string.

Figure 1A:
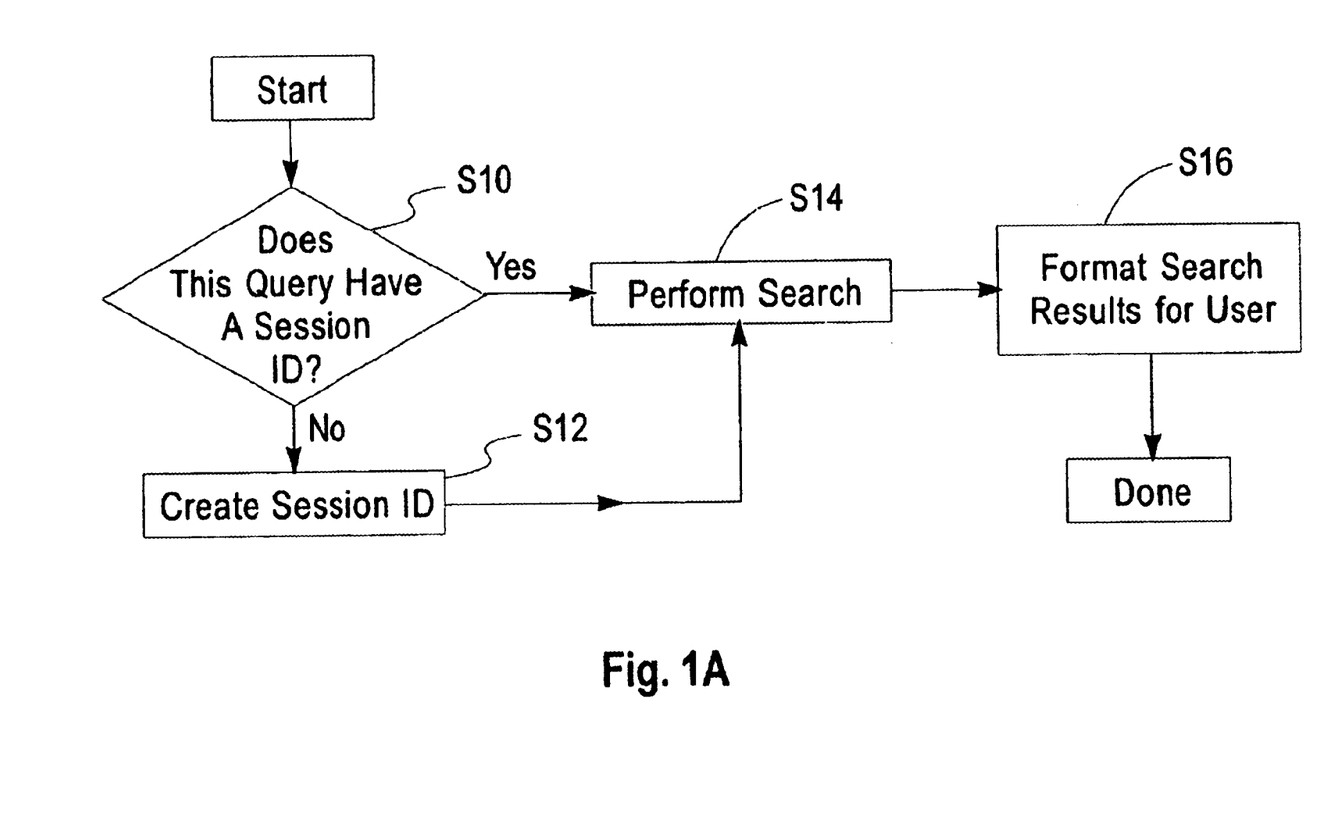
FIG. 1(a) is a flow chart for an initial query search in accordance with a searching process of a preferred embodiment of the present invention.
Figure 1B:
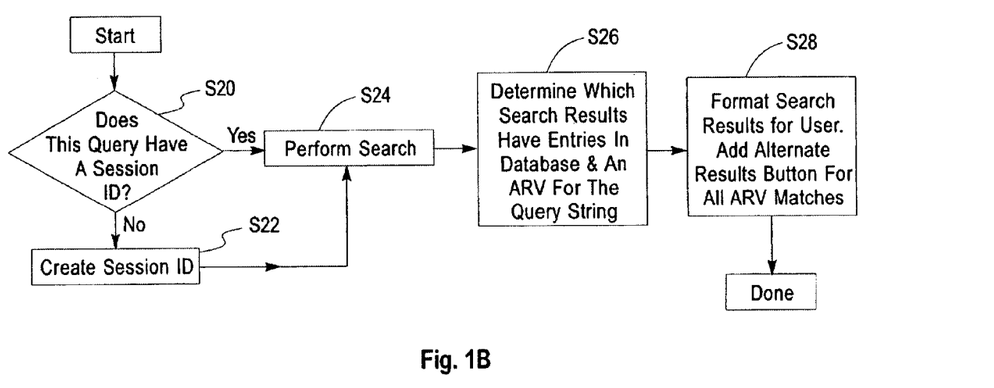
FIG. 1(b) is a flow chart for subsequent query searches in accordance with the searching process of the preferred embodiment.
Figure 1C:
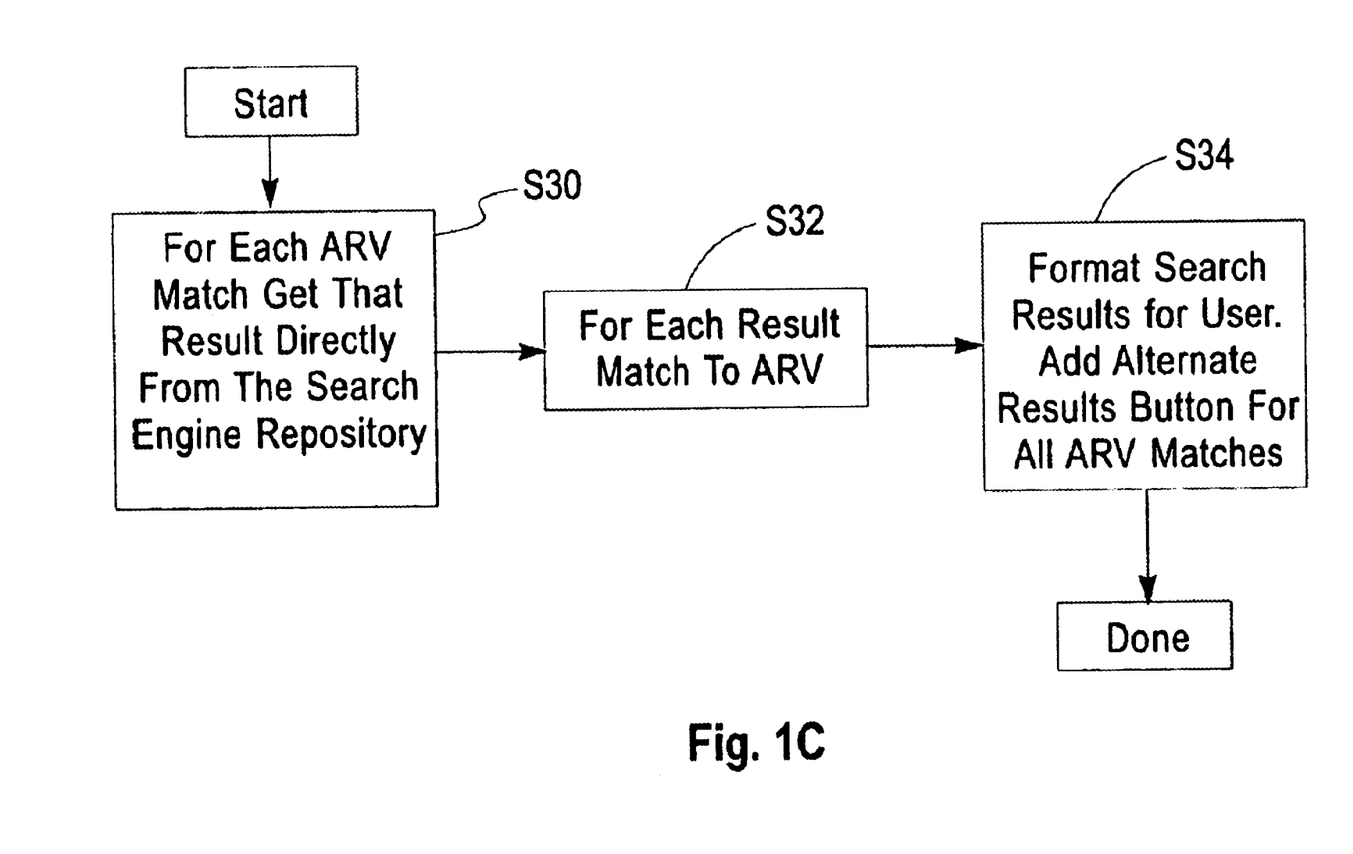
FIG. 1(c) is a flow chart for providing alternate search results in accordance with the searching process of the preferred embodiment.
Figure 3:
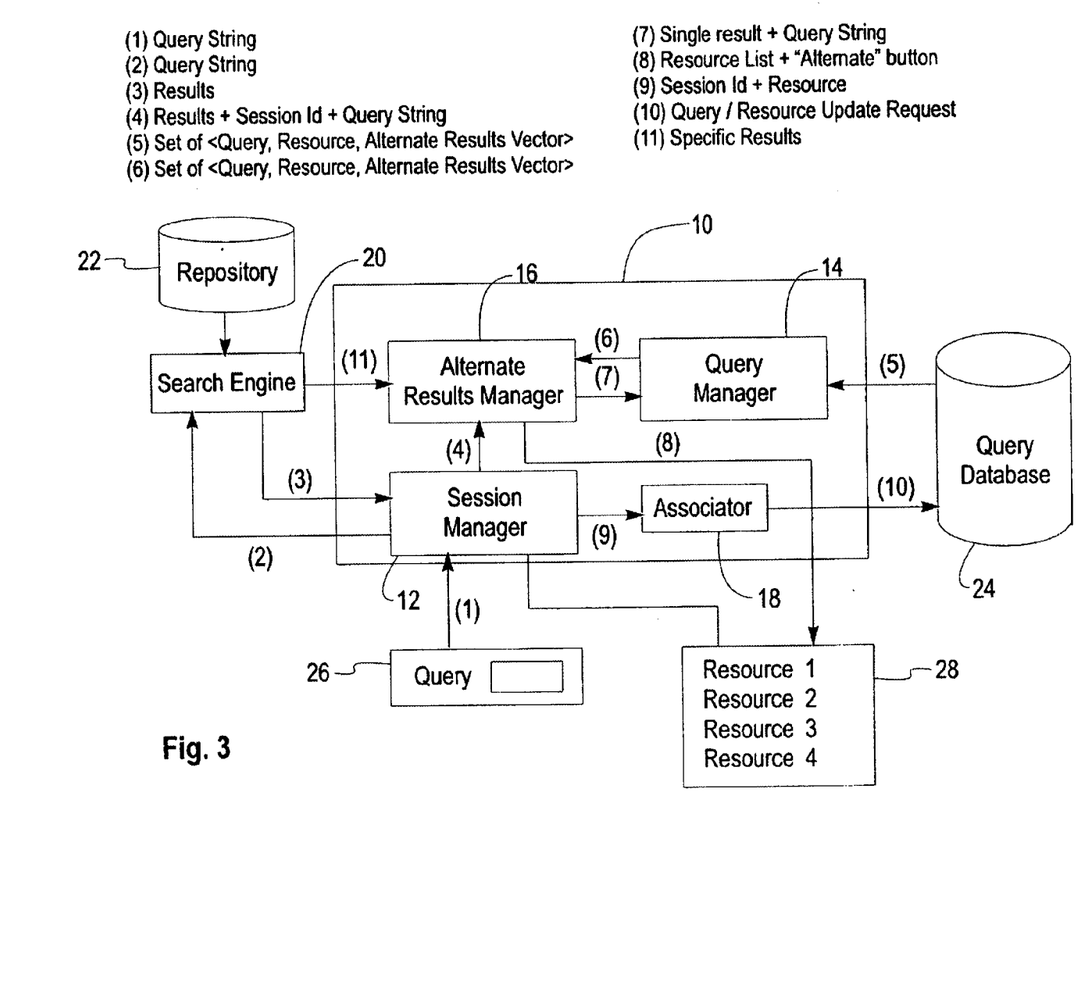
FIG. 3 is a block diagram of a system for providing search results in accordance with one embodiment of the present invention.

A searching process according to a preferred embodiment of the present invention will now be explained in more detail with reference to the flow charts of FIGS. 1(a), 1(b), and 1(c). FIG. 3 shows a system that performs the searching process. As shown, the system includes a controller 10, a search engine 20, a repository 22, and a query database 24. The components of the controller 10 include a session manager 12, a query manager 14, an alternate results manager 16, and an associator 18. The session manager 12 intercepts all user input so as to allow the controller 10 to perform the searching process of the preferred embodiment.

Initially, there are no entries in the query database 24. When a first user submits a first query using an input device 26, the session manager 12 determines if a session ID has been established (step S10). If not, the session manager 12 creates a session ID (step S12) for the user using standard web technologies (e.g., cookies or active server pages) to store various state and session information. The session ID allows subsequent queries to be matched with the search results selected by this user. After a session ID has been established, the session manager 12 submits the first user's query to the search engine 20. The search engine 20 performs a search and returns the search results to the session manager 12 (step S14). Then, the controller 10 operates to display a list of the search results to the user through an output device 28 (step S16).

Figure 2A:
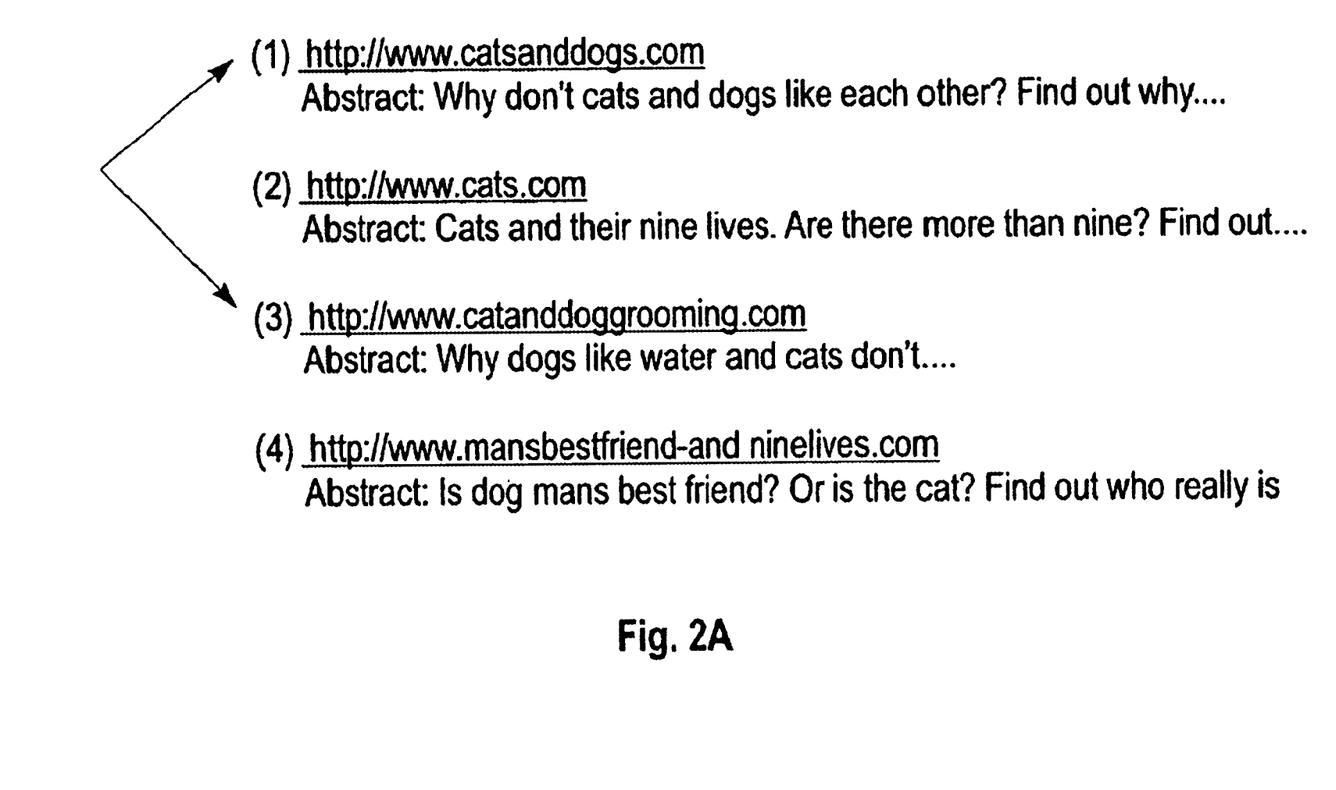
FIG. 2(a) is an exemplary illustration of a portion of the search results returned in response to the initial query of FIG. 1(a)

For the initial query, it is immaterial whether the search results are formatted in a standard manner or by using the process described below because the query database is empty. FIG. 2(a) shows an exemplary list of search results presented to the first user in response to the query "cats and dogs". The first user then peruses the list of search results and may select one or more for further review (step S18). In the controller 10, each selection made by the first user is intercepted by the session manager 12 and routed to the associator 18 in the form of the session ID, the query string, and the selected search result. Because the query database is empty, the associator 18 creates an entry in the query database 24 and creates an "Alternate Results Vector" (ARV) for the query string (step S19).

In this embodiment, the alternate results vector is simply a single element vector composed of a query string and an associated search result (URL) list Each URL keeps a list of query strings used to get to that URL, and each of those query string entries keeps a list of other URLs also in that pool. This allows the system to handle any number of quantifiers for resource relevance or irrelevance. At this point, all of the search results that were selected by the first user have been effectively recorded so that an alternate list of search results can be displayed on subsequent submissions of the same or a similar query string.

Later, when a second user submits a query string, the session manager 12 again determines if a session ID has been established (step S20). If not, the session manager 12 creates a session ID (step S22) for the user. After a session ID has been established, the session manager 12 submits the first user's query to the search engine 20, which performs a search and returns the search results to the session manager 12 (step S24). The session manager 12 then forwards the search results along with the session ID and query string information to the alternate results manager 16. The alternate results manager 16 pairs each search result with the query string and submits this information to the query manager 14, which searches for the search result in the query database 24. If no entry exists for that search result, a false status is returned to indicate that there are no alternate results.

Figure 2B:
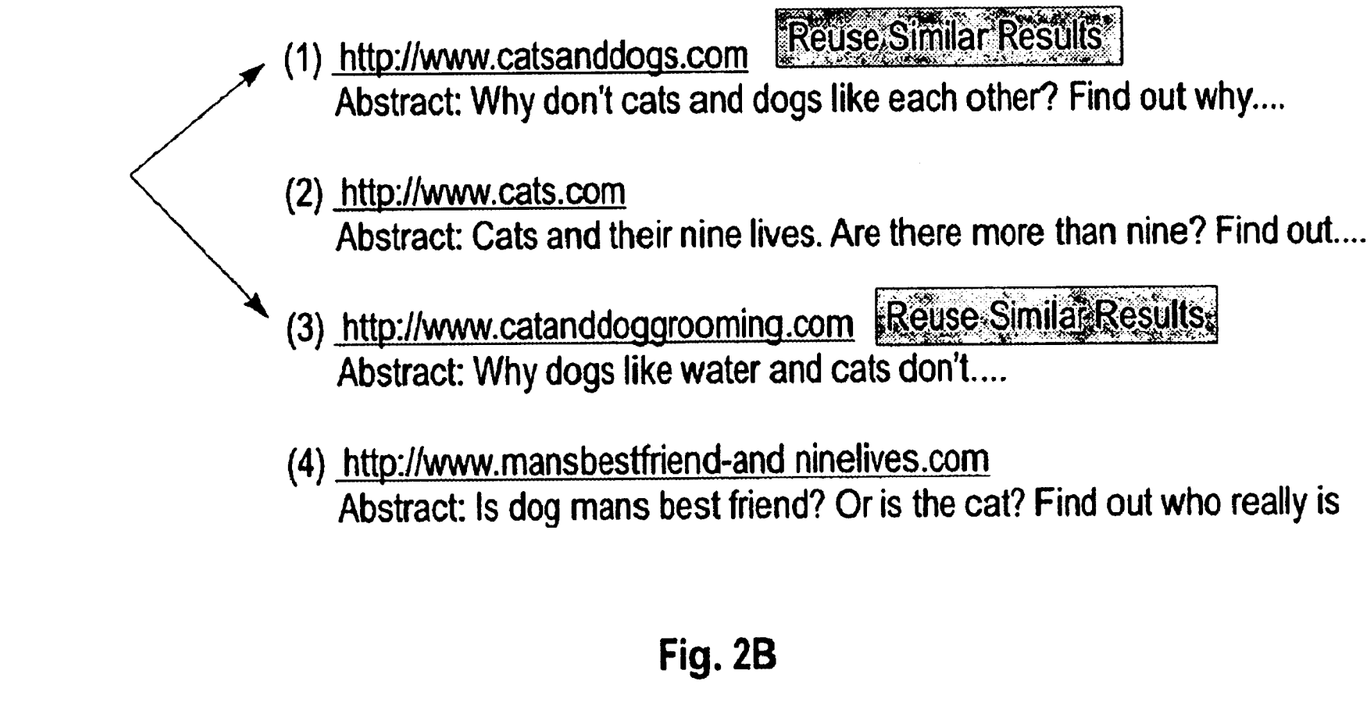
FIG. 2(b) is an exemplary illustration of a portion of the search results returned in response to the subsequent query of FIG. 1(b)

On the other hand, if an entry exists for the search result, a search is then made for an Alternate Results Vector (ARV) for the query string. If an ARV for the query string is not found, a false status is returned to indicate that there are no alternate results. Conversely, if an ARV for the query string is found, the query manager 14 returns a true status to indicate that there are alternate results (step S26). Then, the alternate results manager 16 formats the list of search results for display on the output device 28. In particular, alongside each search result for which a true status was returned, there is displayed a graphical element such as an alternate results button to indicate to the user that an alternate list of search results is available (step S28). For example, FIG. 2(b) shows a list of search results displayed to the second user in response to the same query if the first user selected search results (1) and (3) of FIG. 2(a).

When the list of search results is displayed, the second user can either select one of the search result for further review or select the alternate results button. If one of the search results is selected, the browser goes directly to that page (or the request is routed through the session manager). Even if the alternate results button is not selected, the mere displaying of the button alongside each of the search results that was previously selected by the first user assists the second user by indicating which of the currently displayed search results had been previously selected.

On the other hand, if the alternate results button is selected, the session manager 12 forwards the session ID, query string, and alternate results message to the alternate results manager 16. The alternate results manager 16 then references the results from the query database 24 using the query string. Next, all of the search results in that ARV are retrieved directly from the search engine (step S30). All ARV results found in the search engine are then formatted for display on the output device (steps S32 and S34). Thus, the second user is presented with alternate list of results that matches the query string that was submitted.

Accordingly, the search system and method of the present invention takes advantage of the superior ability of humans to evaluate search results. In particular, the typical user selects a search result after evaluating its abstract and deciding that this search result is likely to contain the information being sought by the query that was submitted. This human knowledge is automatically collected to organize search results for a particular query and can later be reused by other users. Because users can view and select from prior user selections, they save time reading abstracts.

This integration of human evaluation capabilities makes browsing drastically improved, simplified, and more user friendly. Furthermore, the search system and method of the present invention makes browsing easier and easier for each subsequent user.

Figure 4:
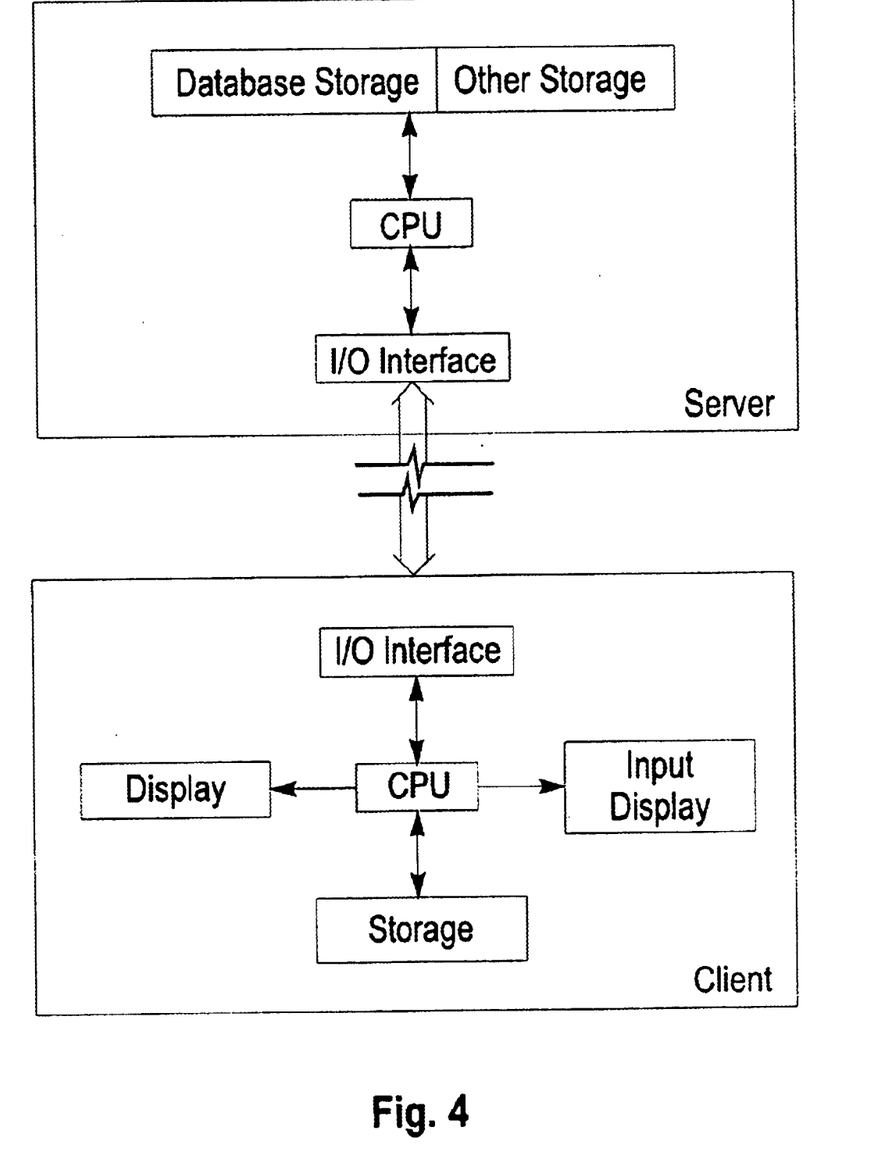
FIG. 4 is a block diagram of an exemplary information processing system for implementing the searching system and process of the present invention.

The system and technique of the present invention can be implemented in hardware, software, or a combination of the two. For example, at least a portion of the system can be embodied in software programs that are stored on a computer-readable medium (e.g., magnetic disk, optical disk, or non-volatile memory) for execution by a computer. Similarly, such processes can be embodied in a web server and client like those illustrated in FIG. 4. Additionally, embodiments of the present invention described above relate to Internet search engines. However, the system and method of the present invention are not so limited and could be used for other search functions and with any type of network. Likewise, embodiments of the present invention can be written in Java, C, or any other language. Other design choices, such as front end of the query tool, the format of the displayed search results, and the processes for retrieving the search results and transferring information could also easily be adapted. Further, embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for associating search results, said method comprising the steps of:

providing a first list of search results to a first user in response to a first query;

for each of the search results from the first list that is selected by the first user, storing a relationship between the first query and that search result in a query database;

receiving a second query from a second user, the second query being the same as or similar to the first query; and providing to the second user an alternate list consisting of the search results that have been previously selected by at least one user in response to the first query and/or similar queries as indicated by the relationships for the first query that are stored in the query database.

2. The method as defined in claim 1, further comprising the steps of:

before the step of receiving the second query from the second user, providing the first list of search results to a plurality of other users in response to queries that are each the same as or similar to the first query; and for each of the search results from the first list that is selected by one of the other users, storing a relationship between the first query and that search result in the query database, wherein the alternate list contains only those search results from the first list that were selected by the first user and/or one of the other users.

3. The method as defined in claim 1, wherein the step of providing to the second user the alternate list includes the sub-steps of:

providing the first list of search results to the second user;

receiving a request from the second user to view the alternate list; and providing the alternate list to the second user.

4. The method as defined in claim 1, wherein the storing step includes the sub-steps of:

storing each selected search result in the query database; and for each stored searched result, storing an alternate results vector for each query for which the stored search result was selected, the alternate results vector including the query and a list of the search results that have been previously selected in response to that query.

5. A method for associating search results, said method comprising the steps of:

providing original lists of search results to users in response to queries, each original list of search results being provided to one of the users in response to one of the queries;

for each of the search results from the original lists that is selected by each of the users in response to each of the queries, storing in a query database a relationship between the search result and the query in response to which that search result was selected;

receiving another query that is the same as or similar to one of the queries; and providing an alternate list of search results that contains only those search results that have been previously selected by at least one of the users in response to the one query as indicated by the relationships that are stored in the query database for the one query.

6. The method as defined in claim 5, wherein the step of providing the alternate list of search results includes the sub-steps of:

providing the original list of search results in response to the one query;

receiving a request to view the alternate list of search results; and displaying the alternate list of search results.

7. The method as defined in claim 5, wherein the storing step includes the sub-steps of:

storing each selected search result in the query database; and for each stored searched result, storing an alternate results vector for each of the queries in response to which the stored search result was selected, the alternate results vector including the query and a list of the search results that have been previously selected in response to that query.

8. The method as defined in claim 5, wherein the step of providing original lists of search results includes the sub-step of:

for each of the queries, searching a network using the query so as to produce one of the original lists of search results.

9. A machine-readable medium encoded with a program for associating search results, said program containing instructions for performing the steps of:

providing original lists of search results to users in response to queries, each original list of search results being provided to one of the users in response to one of the queries;

for each of the search results from the original lists that is selected by each of the users in response to each of the queries, storing in a query database a relationship between the search result and the query in response to which that search result was selected;

receiving another query that is the same as or similar to one of the queries; and providing an alternate list of search results that contains only those search results that have been previously selected by at least one of the users in response to the one query as indicated by the relationships that are stored in the query database for the one query.

10. The machine-readable medium as defined in claim 9, wherein the step of providing the alternate list of search results includes the sub-steps of:

providing the original list of search results in response to the one query;

receiving a request to view the alternate list of search results; and displaying the alternate list of search results.

11. The machine-readable medium as defined in claim 9, wherein the storing step includes the sub-steps of:

storing each selected search result in the query database; and for each stored searched result, storing an alternate results vector for each of the queries in response to which the stored search result was selected, the alternate results vector including the query and a list of the search results that have been previously selected in response to that query.

12. The machine-readable medium as defined in claim 9, wherein the step of providing original lists of search results includes the sub-step of:

for each of the queries, searching a network using the query so as to produce one of the original lists of search results.

13. A system for providing search results, said system comprising:

a search engine for providing original lists of search results to users in response to queries, each original list of search results being provided to one of the users in response to one of the queries;

a query database for storing, for each of the search results from the original lists that is selected by each of the users in response to each of the queries, a relationship between the search result and the query in response to which that search result was selected; and a controller for providing an alternate list of search results in response to another query that is the same as or similar to one of the queries, wherein the alternate list of search results consists of the search results that have been previously selected by at least one of the users in response to the one query as indicated by the relationships for the one query that are stored in the query database.

14. The system as defined in claim 13, wherein the controller includes:

means for providing the original list of search results in response to the one query;

means for receiving a request to view the alternate list of search results; and means for displaying the alternate list of search results.

15. The system as defined in claim 13, wherein the query database stores each selected search result, and for each stored searched result, an alternate results vector for each of the queries in response to which the stored search result was selected, the alternate results vector including the query and a list of the search results that have been previously selected in response to that query.

16. The system as defined in claim 13, wherein for each of the queries, the search engine searches a network using the query so as to produce one of the original lists of search results.

17. The method as defined in claim 1, wherein each of the search results in the first list of search results includes a hyperlink to an external resource.

18. The method as defined in claim 17, wherein each of the search results in the first list of search results further includes a short abstract of the external resource.

19. The method as defined in claim 17, wherein the storing step includes storing a relationship between each of the hyperlinks from the first list that is selected by the first user and the first query, and the alternate list includes only the hyperlinks that have been previously selected by at least one user in response to the first query and/or similar queries.

20. The method as defined in claim 1, wherein in the storing step, the relationships are stored by storing in the query database the selected search results, each with a list of the queries in response to which that search result has been selected.

* * * * *